United States Patent [19]
Evans et al.

[11] 4,369,445
[45] Jan. 18, 1983

[54] AUTOMATIC ECM VIDEO PROCESSOR

[75] Inventors: Norol T. Evans, San Pedro; Robert B. Nelson, Anaheim, both of Calif.

[73] Assignee: Hughes Aircraft Company, Culver City, Calif.

[21] Appl. No.: 538,171

[22] Filed: Mar. 23, 1966

[51] Int. Cl.³ .................................................. G01S 7/36
[52] U.S. Cl. ................................ 343/18 E; 343/5 VQ
[58] Field of Search ................. 343/5 DP, 17.1, 18 E, 343/5 VQ

[56] References Cited

U.S. PATENT DOCUMENTS 2,862,204 11/1958 Henrici et al. ................. 343/18 E X
3,689,922 9/1972 Phillips, Jr. ..................... 343/18 E X
4,231,037 10/1980 Long ............................... 343/5 VQ X Primary Examiner—T. H. Tubbesing
Attorney, Agent, or Firm—Walter J. Adam; Leonard A. Alkov; W. H. MacAllister

[57] ABSTRACT

A video processor that responds to the video signals received from a group of radar receivers to automatically select the video that is least affected by ECM environment in which the receivers operate. Each receiver in the group has known ECM characteristics so that the effect of different forms of ECM on its video output signals may be detected. By continually monitoring the video output signals different receivers are continually selected to minimize the effect of ECM environment on the radar operation.

8 Claims, 8 Drawing Figures

| ECM ENVIRONMENT | SIGNALS TRUE | SELECTED VIDEO OF RECEIVER |
|---|---|---|
| CLUTTER | $K_1$ AND/OR $K_2$ | MTI |
| DISPERSED CLUTTER OR CHAFF | $E\ \overline{H\ I}$ | MTI |
| PULSE JAMMING<br>FAST SWEEP JAMMING<br>TRANSIENT INTERFERENCE | $\overline{E}\ \overline{H}\ \overline{I}$<br>$\overline{E}\ H\ \overline{I}$<br>$E\ H\ \overline{I}$<br>$E\ H\ I$ | LOG RCVR 32<br>WHEN $I$ IS TRUE, GENERATE JAM STROBE SIGNAL |
| CONTINUOUS WAVE JAMMING | $G$ | RCVR 34 |
| (ON FREQUENCY) | $D$ AND $G$ | RCVR 34 AND GENERATE JAM STROBE SIGNAL |
| OFF-FREQUENCY JAMMING | $F$ | RCVR 34 |

FIG. 6.

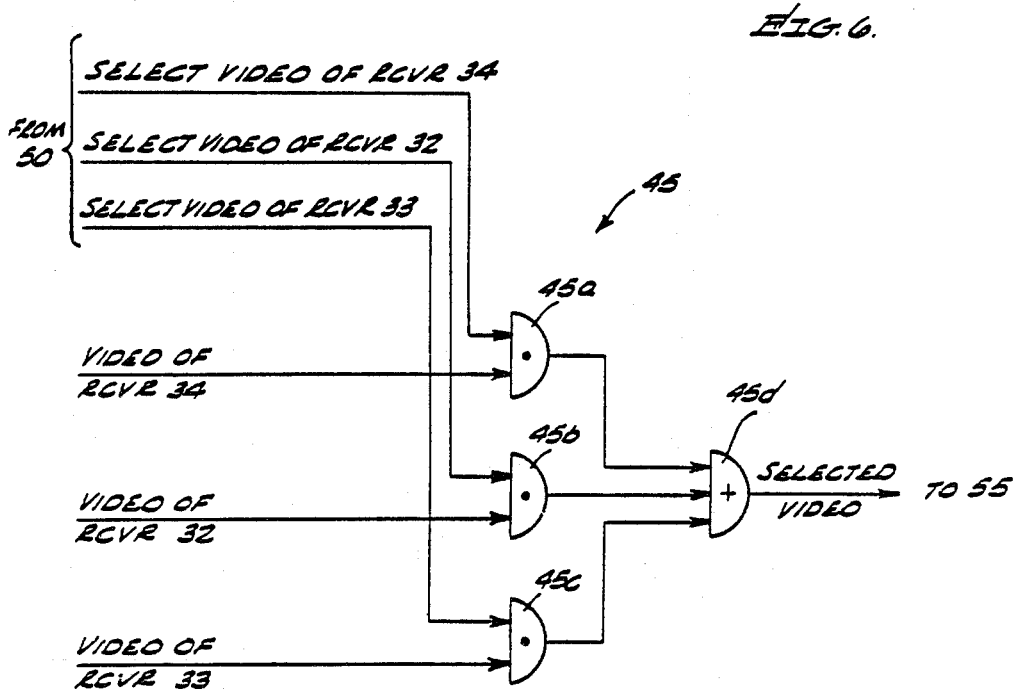

FIG. 8.

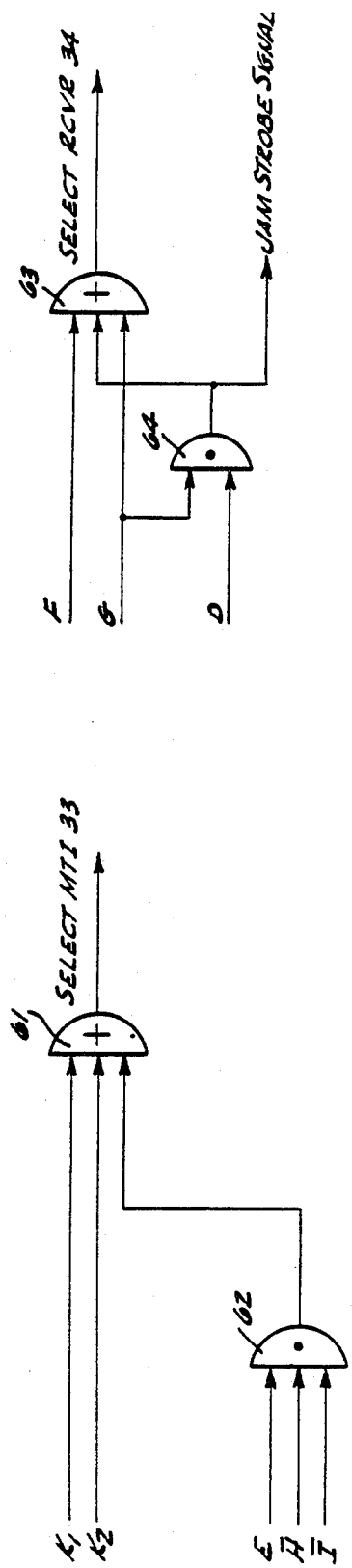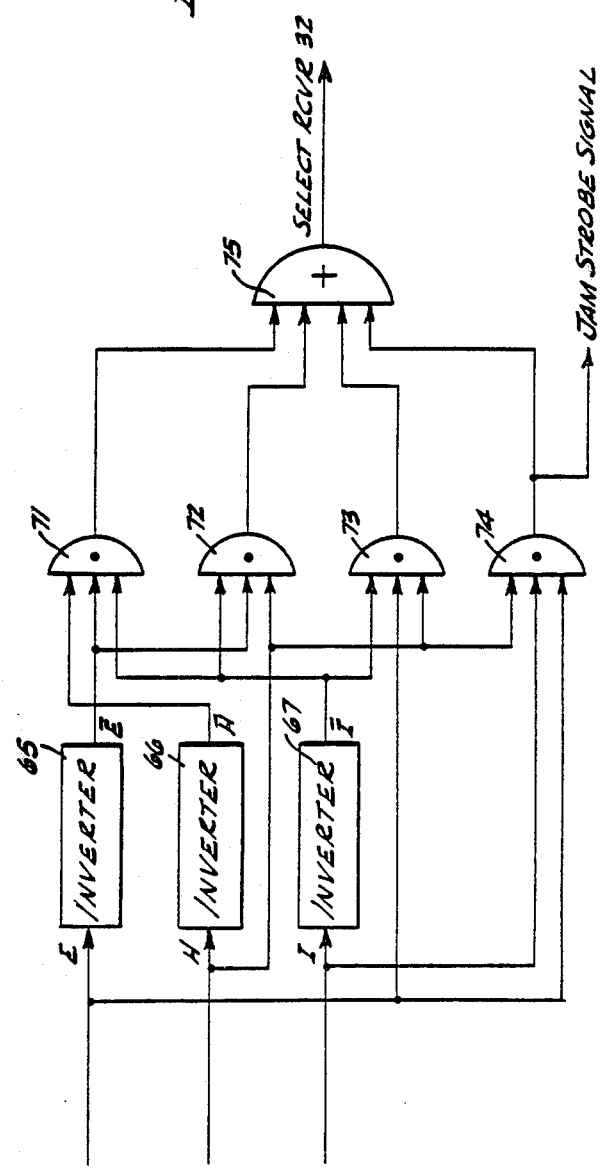
FIG. 7.

AUTOMATIC ECM VIDEO PROCESSOR

This invention generally relates to radar and more particularly to a system for automatically processing radar data in an electronic counter-measure environment.

The effectiveness of even the most advanced radar operating in a hostile environment may be greatly reduced by deliberate interference, or jamming which appears as extraneous responses on the radar display. Various techniques which are used to electronically interfere with radar performance are generally called electronic countermeasures or ECM. ECM may be used to confuse the radar operators by masking or hiding real targets with clutter so that one viewing a radar display cannot observe specific targets of interest. ECM may also be used to deceive the radar operators by interfering with the radar so that false signals appearing as though they were echoes from real targets are displayed on the radar display.

Both confusion and deception ECM may be obtained with either active or passive devices which produce any of a plurality of interfering or jamming signals. Active devices may be used to produce broad band noise jamming, fast sweep jamming, pulse jamming, or pulse interference, while passive devices may be used to produce the effect of solid or dispersed clutter, such as chaff or weather interference.

In light of the various techniques of counter-measures, an effective radar which is to operate in an ECM environment must be capable of countering such counter-measures, and producing meaningful radar data even in the presence of jamming or interfering signals. Herebefore, attempts have been made to counter ECM with highly complex radar systems which incorporate different types of radar receivers responding differently to different ECM techniques. Highly specialized radar operators are required to operate the plurality of receivers and on the basis of the displayed radar data from the various receivers select the most meaningful and jam and/or interference-free radar data or video for further processing.

The manual selection of the best video for processing is quite deficient in that it is too slow to be included in automatic target and tracking which is necessary in most radar systems for military purposes. Furthermore, manual selection of the best video often produces transients which may not be acceptable in certain applications. Thus a need exists for a system which is not limited by the undesirable characteristics of the manual selection of video from a plurality of different receivers operating in an ECM environment.

Accordingly, it is an object of the present invention to provide an automatic arrangement for selecting video in an ECM environment.

Another object is the provision of a new processor for automatically processing video received in an ECM environment and automatically selecting the best video.

A further object is to provide a processor which automatically processes video received by a group of receivers in an ECM environment and selects the video least affected by the environment.

Yet another object is the provision of a digitally controlled processor for automatically selecting the video from a plurality of different type receivers. The selection is based on the anticipated performance of each receiver under known ECM environments.

These and other objects of the invention are achieved by providing a video processor which responds to video received from a group of radar receivers to automatically select the video which is least affected by ECM environment in which the receivers operate. Each receiver in the group has known ECM environment characteristics. That is, the effect of different forms of ECM on its video output are known. In the processor, the video outputs of at least some of the receivers are monitored to generate signals which may be indicative of certain ECM environments. These signals are then utilized to automatically select the video of the receiver which on the basis of the signals, is presumed to be the least affected by the ECM environment.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 3 is a simplified diagram of one of the receivers shown in FIG. 2;

FIG. 4 is a block diagram of a clutter gate shown in FIG. 2;

FIG. 5 is a waveform diagram useful in explaining the invention;

Figure 2:
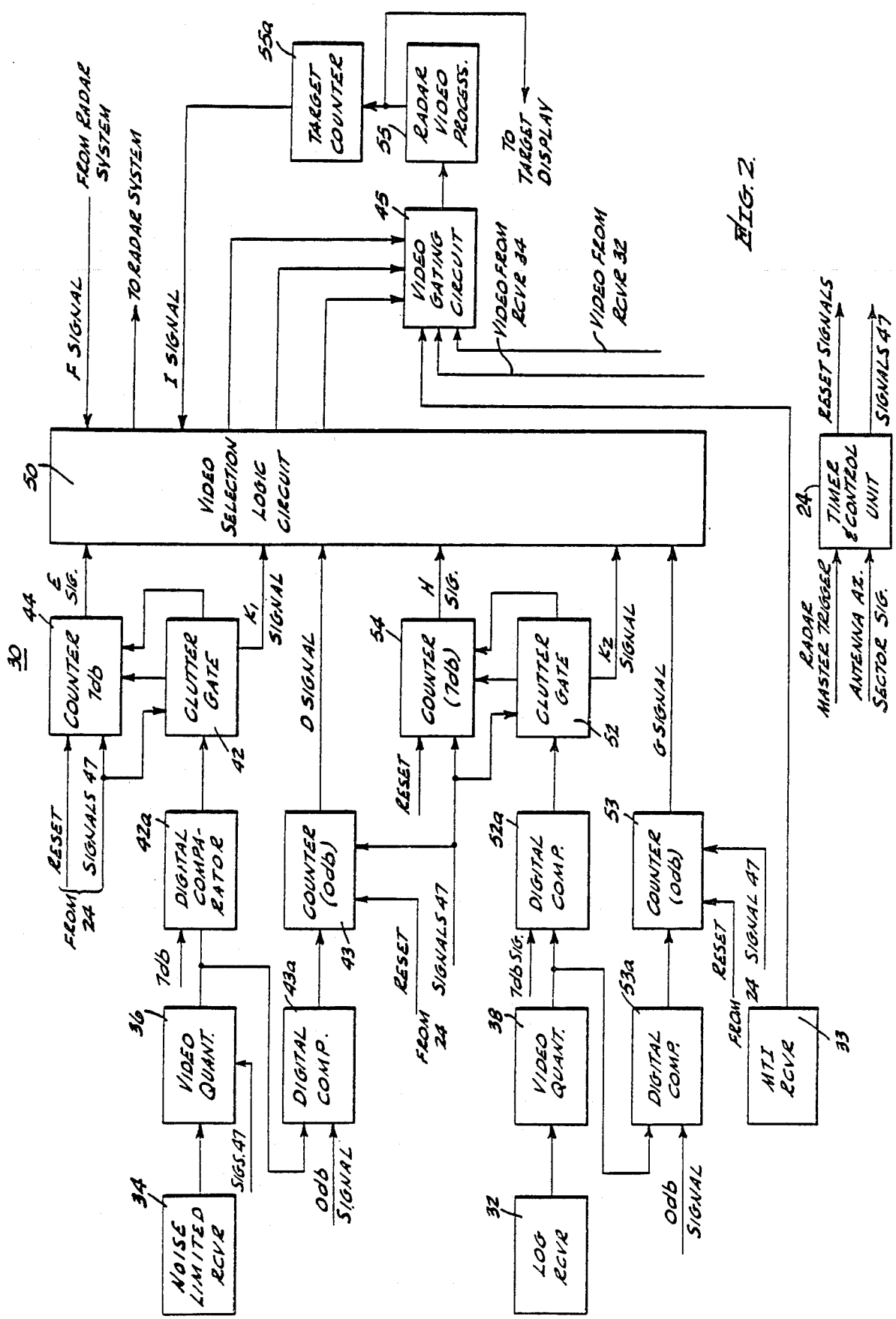
FIG. 2 is a more detailed block diagram of the processor of the invention.

FIG. 6 is a chart summarizing the logical operations of the video selection logic circuit 50 of FIG. 2; and FIGS. 7 and 8 are diagrams of the logic circuit 50 and video gating circuit 45 respectively, shown in FIG. 2.

Figure 1:
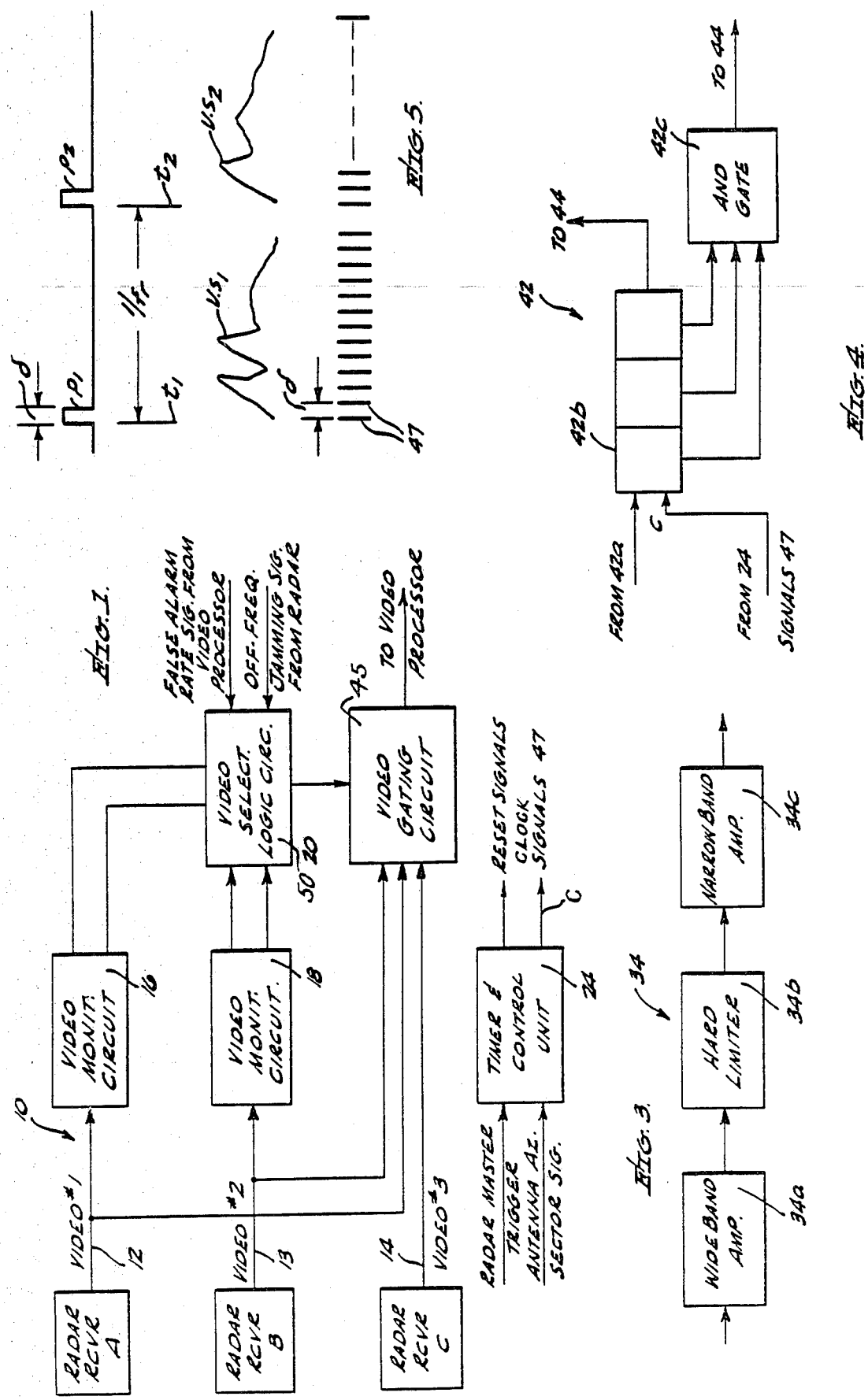
FIG. 1 is a general block diagram of the present invention.

Reference is now made to FIG. 1 which is a block diagram of the novel processor of the invention. Processor 10 is shown to include a plurality of input lines 12, 13 and 14 which couple the processor to radar receivers A, B, and C respectively which form part of a radar system, assumed to be operating in an ECM environment. As is appreciated by those familiar with the art, certain known ECM environments affect different types of radar receivers in different ways. For example, in the presence of an active ECM environment in which slow sweep jamming resembling solid clutter or in a passive ECM environment which includes chaff to resemble dispersed clutter, it would be preferable to use the output of a moving target indicator, or MTI receiver, which is designed to distinguish moving targets from substantially stationary clutter. On the other hand, in other forms of interference, such as for example pulse jamming, or fast sweep jamming, it is preferable to use video output of a wide band-hard limited radar receiver since such a receiver is least affected by such forms of interference.

In accordance with the teachings of the present invention, the performance characteristics of each of the receivers A, B and C under different ECM environments are known. The video signals provided by at least a few of the receivers are analyzed and on the basis thereof, the particular ECM environment in which they operate may be determined. Once such determination is made, the video signals or output of the receiver least affected by such environment is selected automatically for further video processing to produce target information which is the basic function of the radar system.

The analysis of the video signals of at least some of the receivers is done to sense the performance of these receivers under the unknown ECM environment. Since each receiver has unique performance characteristics under known ECM environments by determining the performance of at least some of the receivers, the ECM environment under which they operate may be deduced. As seen in FIG. 1, the video signals from receivers A and B are supplied via lines 12 and 13 respectively to video monitoring circuits 16 and 18. The function of these is to analyze or monitor the video signals from receivers A and B respectively and provide signals which are indicative of the performances of the two receivers in the unknown ECM environment.

These signals, also referred to hereafter as performance-indicating signals, are supplied to a video selection logic circuit 50. The latter circuit utilizes these performance-indicating signals in logic circuitry to generate an output signal as a function of the control signals and the known performance characteristics of radar receivers A and B under known ECM environments. The output signal of circuit 50 is then used to energize a video gating circuit 45 to select for transfer to a radar video processor (not shown) the video signals of one of receivers A, B or C which, on the basis of the output signal of circuit 50, is assumed to be the least affected by the particular ECM environment in which the three receivers operate at the particular time.

The processor 10 is also shown to include a timer and control unit 24 which in response to various triggering signals from the radar system, such as a radar master trigger and antenna azimuth sector signal, provides clock pulses C and other control signals to the various circuits. Unit 24, instead of being a separate circuit, may be part of the main radar system control unit which, as is appreciated by those familiar in the art, forms part of every radar system to control the sequence of operations therein, as well as provide accurate timing pulses needed to relate the various transmitted radar signals and the received radar echoes.

Referring again to FIG. 1, the video selection logic circuit 50 in addition to receiving the performance-indicating signals from circuits 16 and 18 may also be provided with signals from a video processor (not shown) to which the video selected by gating circuit 45 is provided. The signals from such processor may be used to alter the logic operation of circuit 50 and thereby further control the selection of the video. Assuming for example, that the video supplied through video gating circuit 45 results in an excessive target false alarm rate, the video processor may supply logic circuit 50 with a signal which may alter the selection of the video in circuit 45, to reduce the false alarm rate. Also logic circuit 50 may be supplied with signals from other sources such as the main radar system to indicate certain ECM environments determined by other means in order to control the automatic video selection. For example, the radar system may provide circuit 50 with a signal indicating off-frequency jamming to further control logic circuit 50 to provide an output signal whereby the video signals of the receiver least affected by off-frequency jamming is automatically selected in video gating circuit 45.

Reference is now made to FIG. 2 which is a block diagram of a specific arrangement of an automatic ECM processor constructed in accordance with the teachings of the present invention. ECM processor 30 is shown connected to a log radar receiver 32, an MTI receiver 33 and a noise-limited receiver 34. Briefly, receiver 34 may be though of as comprising a wide band amplifier 34a shown in FIG. 3, to which reference is made herein, followed by a hard limiter 34b which is coupled to a narrow band amplifier 34c. Such a receiver has been found to have superior rejection of the effects of fast swept jamming which greatly affects the performance of a log or narrow band receiver due to their long ring down time when being subjected to an impulse. In the noise-limited receiver 34, due to the wide bandwidth of amplifier 34a, transients induced in the receiver by fast swept jamming etc. exhibit short ring down times. The transients are limited below the thermo noise level by limiter 34b prior to being processed through narrow band amplifier 34c where the transient ring down time is excessive. The bandwidth of 34c is by necessity set to approximately the reciprocal of the effective transmitted pulse width. The long ring down time of the narrow band amplifier 34c to transients will not affect the output due to the reduced transient level coming out of hard limiter 34b. Video signal to noise dynamics range is reestablished after the hard limiter due to the wide band limited noise to narrow band noise processing. Such and similar techniques for reducing or canceling noise effects are known in the art. A similar arrangement is diagrammed and described on Page 558 of "Introduction to Radar Systems" by Merrill I. Skolnik published in 1962 by McGraw-Hill Inc., Library of Congress Catalog Card Number 61-17675.

As seen from FIG. 2, the outputs of receivers 34 and 32 are quantized in video quantizers 36 and 38 respectively. Each of the quantizers is controlled by sampling rate clock signals from the timer and control unit 24 to digitize each video sweep into a series of digital signals at a rate equal to the inverse of the transmitted pulse period so that each digitized signal may be thought of as representing video from another range interval. For example, if each video sweep is received in response to a pulse of duration $\delta$ transmitted at a pulse repetition frequency or PRF $f_r$, the video sweep is digitized into digital signals produced at a rate of $1/\delta$. The output of each quantizer in response to each video sweep is thus a series of digital signals each representative of the amplitude of the signals received from another range interval. Each quantizer, the output of which is a multibit number, is operated so that its numerical output is related to the received signal amplitude in db's. Thus a digital output of 0 is representative of a 0 db input signal and a digital output of 7 represents a 7 db input signal.

The output of quantizer 36 is supplied to a clutter gate 42 through a digital comparator 42a and to a counter 43 through a digital comparator 43a. Comparator 43a compares the output of quantizer 36 with a 0 db reference signal and provides a binary signal such as a "1" to counter 43 whenever the output of quantizer 36 is 0 db and a binary signal such as a "0" whenever the output of quantizer 36 is above 0 db. Thus, the number of "1's" and "0's" supplied to counter 43 during any time period represents the number of signals below and above 0 db from quantizer 36.

Counter 43 which is a reversible counter is operated to count in one direction when "1's" are supplied thereto and in an opposite direction when supplied with "0's" and provide an output signal such as a binary "1" when the count therein reaches a predetermined number value. For example in one embodiment having determined from statistical studies that the probability of 0 db signals from quantizer 36 under normal conditions is 0.3678, that is about 36 0 db signals out of every 100 signals, counter 43 is chosen to be a 5 bit counter. At the beginning of each sweep interval, the counter is reset to all "1's" in its five bits. Then during the interval, a binary "1" from comparator 43a indicating a signal 0 db or above causes the counter 43 to count up by eight while a binary "0" reduces its count by one. The count-up factor of 8 biases the counter so that the number of times that a D signal is erroneously generated is reduced to an acceptable false alarm rate value. Since 0 db is only crossed approximately one-third of the time in the illustrated arrangement, the count of 8 is utilized to establish a substantially constant false alarm rate value at the output terminal of the counter 43, which false alarm rate is the same as that at the output of the counter 44. Only when counter 43 reaches an all zero count is a signal designated in FIG. 2 by letter D supplied to a video selection logic circuit 50 to indicate that receiver 34 is captured. The receiver is captured when the hard limiter 34b as shown in FIG. 3 is saturated by an interfering signal which in turn substantially reduces the noise level at the narrow band signal amplifier 34c. In this captured condition the interfering signal is not in the narrow passband of the narrow band amplifier but is within the passband of the hard limiter 34b. The probability of getting 32 signals in a row each below 0 db and thereby produce a false capture signal is $(1-.36)^{32}$ which is quite small.

As seen from FIG. 2, the output of quantizer 36 is supplied through comparator 42a to the clutter gate 42 which is in turn connected to a reversible counter 44. Comparator 42a is similar to comparator 43a except that it compares a 7 db signal with the signal from quantizer 36 and provides gate 42 with a binary "1" when the quantizer signal is 7 db and a binary "0" when the quantizer signal is less than 7 db. Since the output of the quantizer 36 changes once each sampling interval $1/\delta$ equal to a range bin interval, the binary signals supplied to gate 42 vary during each such interval.

The operation of clutter gate 42 may best be explained in conjunction with FIG. 4 wherein the gate is shown comprising a shift register 42b which responds to the sampling clock signals from unit 24 to clock the binary signals supplied thereto from comparator 42a at the rate of one binary signal per sampling or range bin interval. The output of the register 42a is connected to the input of counter 44, with each register output of a binary "1" representing a digital signal of 7 db causing the counter to count in one direction and each binary "0" output representing a digital signal of less than 7 db causing the counter to count in the opposite direction.

Let us assume that under normal conditions the probability of a 7 db noise signal is about one in 149 signals and that when every 8th signal is 7 db, it indicates receiver jamming. Then in accordance with the teachings of the present invention reversible counter is chosen to be of 10 bits. It is reset to a zero count by a reset signal from unit 24 provided as a function of the radar 90° azimuth sector signal, thus resetting counter 44 to zero each quadrant. During a quadrant sweep, a binary "1" from the output of register 44b (FIG. 4) of gate 44 representing a 7 db signal causes counter 44 to count up by 16 while a binary "0", indicating a signal less than 7 db, causes counter 44 to count down by one. The operation of the counter 44 with a count-up of 16 is provided so that, in response to the probability statistics of the input signal, the E signal has substantially the same false alarm rate as the D signal. Thus in a jamming situation if on the average one out of every eight binary signals supplied during an eight range bin interval were a false alarm, the count would increase by nine during each eight range bin interval.

When during the quadrant sweep, the count in counter 44 reaches 512, it indicates that receiver 34 is jammed. As a result, a signal E, such as a binary "1", is supplied to logic circuit 50. On the other hand, as long as the count in counter 44 is less than 512, the complement of the E signal, indicated by $\overline{E}$, i.e. a binary "0", is supplied to circuit 50.

Since the presence of clutter results in large signals which if counted by counter 44 may be confused as indicated receiver jamming gate 42 is used to inhibit counter 44 from counting 7 db signals which are produced by clutter. Since clutter often may spread into several range bin intervals, in accordance with the teachings of the invention, register 42b (FIG. 4) includes a plurality of bits such as for example three bits, each connected to an AND gate 42c whose output is connected to the counter 44. As long as one of the three bits stores a "0" representing a signal of less than 7 db, the output of AND gate 42c is to be a "0" and counter 44 is free to count the signals supplied thereto. However when all three bits store "1's", i.e. indicating that three successive signals were of amplitudes of 7 db or more, it is assumed to be a result of clutter. As a result, AND gate 42c is enabled to provide a binary "1" to counter 44 and inhibit it from counting the signals supplied thereto. The binary "1" output of gate 42c indicating clutter may also be supplied to circuit 50. This signal is designated in FIG. 2 by the letter K.

From the foregoing, it should be appreciated that the output signals of counters 43 and 44 and gate 42 designated D, E and $K_1$ respectively, are indicative of the performance of receiver 34 and the presence or absence of detected clutter. When signal D is a binary "1", it indicates that receiver 34 is captured, while its complement $\overline{D}$, being a binary "0", indicates that the receiver 34 is not captured. Similarly, signals E and $\overline{E}$ indicate that receiver 34 is jammed and not jammed respectively, while $K_1$, being a binary "1", indicates the presence of clutter and $\overline{K}_1$ being its complement represents the absence of clutter.

The operation of quantizer 36, timer and control unit 24, gate 42 and counters 43 and 44 may be summarized on conjunction with FIG. 5 in which time is shown along the abscissa. Therein, pulses $P_1$ and $P_2$ represent two radar pulses, each of $\delta$ duration, transmitted at a PRF $f_r$, at time $t_1$ and $t_2$ respectively. In response to each transmitted pulse, unit 24 provides sampling rate clock signals designed in FIG. 5 by numeral 47, the signals being generated at a frequency $1/\delta$ so that the interval between signals is $\delta$, which equals the duration of each of the transmitted signals. These signals are used to control the quantizer 36 to digitize each received video sweep such as v.s.$_1$ and v.s.$_2$ received as echoes in response to transmitted pulses P1 and P2 respectively. Thus each digital output of quantizer 36 may be thought of as representing video from another range interval.

The sampling rate control signals 47 are also used to control counters 43 and 44 to either count up or down depending on the signals supplied thereto from the comparators 43a and 44a respectively. Also signals 47 are used to control shift register 42b of clutter gate 42 to shift the content thereat once each sampling rate period. In addition counter 43 is reset by pulses P1, P2, etc. at the PRF $f_r$ while counter 44 is reset at the beginning of each 90° azimuth sector indicated by a signal supplied thereto from the timer and control unit 24.

The output of quantizer 38 which, like that of quantizer 36, is a series of multibit outputs representing video from different range intervals is supplied to an arrangement identical to that herebefore described for monitoring said output to determine the capture and jamming conditions of receiver 32. As seen from FIG. 2, the output of quantizer 38 is supplied to a clutter gate 52 through a digital comparator 52a and to a counter 53 through a comparator 53a, while the output of gate 52 is supplied to a counter 54. The outputs of gate 52, counters 53 and 54, which are designated $K_2$, G and H respectively are supplied to logic circuit 50. Thus for example when signal H is true, it indicates that receiver 32 is jammed while a true G signal indicates that the receiver is captured and a true $K_2$ signal indicates the presence of clutter.

From the foregoing, it is thus seen that the logic circuit 50 is provided with signals which indicate the performance of receivers 32 and 34. Signals D and G may be thought of as receiver-capture-indicating signals, while the jamming of the two receivers is indicated by signals E and H. Signals $K_1$ and $K_2$ indicate that clutter has been detected in the video signals of receivers 34 and 32 respectively. These signals, on the basis of the known performance characteristics of receivers 32 and 34 in different ECM environments, are used in the logic circuit 50 to generate signals which cause a video gating circuit 45 to automatically select the video signals from the receiver which is least affected by the ECM environment at the particular period in time. For example, when signals $K_1$ and $K_2$ are true, thereby indicating that clutter is detected in both receivers 34 and 32, or if only $K_1$ is true indicating that clutter is detected in receiver 34, logic circuit 50 provides a control signal to circuit 45 to automatically select the video signal of the MTI receiver 33 for processing in radar video processor 55. In the absence of an MTI receiver when $K_1$ is true, it may be supplied to the main radar system to reject the leading edge of the clutter in the log receiver and then select the video of the log receiver of the next range bin period.

The radar video processor 55, to which is supplied the video signals selected by the video gating circuit 45, may be operable in accordance with any known radar receiving technique to derive target signals which may then be supplied to a target display (not shown). The output of the processor 55 may also be supplied to a target counter 55a. The function of counter 55a is to count the target signals produced in processor 55 and provide a signal to circuit 50 when the target false alarm rate is excessive. The logic circuit 50 is also provided with an F signal indicative of an off-frequency jamming ECM environment detected by other circuitry in the radar system.

The various signals supplied to video selection logic circuit 50, and the performances or phenomena which they indicate may best be summarized by the following table.

| SIGNAL | PERFORMANCE |
|---|---|
| D | Receiver 34 captured |
| $\overline{D}$ | Receiver 34 not captured |
| E | Receiver 34 jammed |
| $\overline{E}$ | Receiver 34 not jammed |
| F | Off-frequency jamming |
| $\overline{F}$ | No off-frequency jamming |
| G | Receiver 32 (log) captured |
| $\overline{G}$ | Receiver 32 (log) not captured |
| H | Receiver 32 (log) jammed |
| $\overline{H}$ | Receiver 32 (log) not jammed |
| I | Output target report excessive |
| $\overline{I}$ | Output target report not excessive |
| $K_1$ | Clutter detected in receiver 34 |
| $\overline{K_1}$ | Clutter not detected in receiver 34 |
| $K_2$ | Clutter detected in receiver 32 |
| $\overline{K_2}$ | Clutter not detected in receiver 32 |

In the foregoing table, each letter represents a different signal and the letter with the bar thereacross the complement thereof. Thus, for example, when signal D is true, it indicates that receiver 34 is captured and when it is false, as indicated by $\overline{D}$, receiver 34 is not captured.

The various signals and their complements are used in circuit 50 as a function of the known performance characteristics of the receivers in different ECM environments to select the video signals of the receiver least affected by the ECM environment present at any given time. Thus, as previously explained, when at least $K_1$ is true indicating that the video of receiver 34 contains clutter, the logic circuit 50 controls gating circuit 45 to supply the video of MTI received by processor 55. Similarly, when other signal combinations occur, thereby indicating particular ECM environments, they are used to select the video of the receiver least affected by such environment.

In accordance with the teachings of the invention, when the combination of signals $\overline{E}H\overline{I}$ is true, it indicates that receiver 34 is jammed while receiver 32 is not jammed and the target report rate is not excessive. The fact that receiver 34 is jammed and log receiver 32 is not, indicates that a dispersed clutter, such as chaff or weather environment, is present in which case the video of MTI receiver 33 is selected. In the absence of receiver 33, the video of log receiver 32 is chosen. If I is true, i.e. the target report rate is excessive, the video of log receiver 32 is still selected and the sensitivity of the system reduced. This may be accomplished by selecting a higher threshold for detection. For example, a typical fan beam radar video processor may require 8/11 hits for detection where a hit represents a threshold crossing of +3 db. The selector unit would then gate only +7 db signals to the video processor, thus reducing the system sensitivity and false alarm rate.

In normal to heavy cases of pulse jamming, fast sweep jamming and transient interference, the following signal relationships have been found to occur:

$\overline{E}\,\overline{H}\,\overline{I}$   normal environment
$\overline{E}\,H\,\overline{I}$   light environment
$E\,H\,\overline{I}$   moderate environment
$E\,H\,I$   heavy environment As is seen from the above relationships, in a normal environment neither receiver is jammed, while in the light situation, log receiver 32 is jammed. In the moderate and heavy environments, both receivers are jammed while the target rate is excessive only in the heavy environment. Generally, when any of the foregoing relationships exist, the video signals of the log receiver 32 are selected at each range bin after proper correlation with the video signal of receiver 34. Correlation is accomplished by comparing signal amplitudes at each range bin. The purpose of the correlation is to require the presence of a signal in both receivers before it is gated to the video processor. This makes the maximum use of the two receiver characteristics at each range bin.

In case of heavy pulse jamming or fast sweep jamming indicated by the fact that signal I is true, the sensitivity of the system may be reduced and in addition a signal may be provided by the logic circuit 50 to the main radar system to generate a jam strobe display such as on a plan position indicator display screen. A jam strobe display on a plan position indicator scope appears as a radial line at a given azimuth position when operating in real time.

Continuous wave (CW) jamming generally results in the capture of log receiver 32 which is indicated by signal G being true. Under such circumstances, the video signals of receiver 34 are selected. If both receivers are captured, i.e. D and G are true, jamming is probably on frequency, in which case the video signals of receiver 34 are still selected. In the latter case, a jam strobe may be generated by the radar system.

Whenever signal F is true indicating off-frequency jamming, the logic circuit 50 causes the selection of the video signals of receiver 34 since in such an ECM environment, the sensitivity of the log receiver 32 is usually reduced.

From the foregoing, it should be appreciated that the selection of the video signals is automatically accomplished by controlling video gating circuit 45 with signals from the logic circuit 50 which are generated as a function of the performance-indicating signals supplied thereto such as signals D through I, $K_1$ and $K_2$ and on the basis of the known performance characteristics of the various receivers under different ECM environments. In the previous example, the performance-indicating signals included those indicating receiver capture (D and G), receiver jamming (E and H), presence of clutter ($K_1$ and $K_2$), off-frequency jamming (F), and excessive target rate (I). It is appreciated that other types of performance-indicating signals may be employed in selecting the video signals of the receiver least affected by a certain ECM environment. By automatically selecting the video signals, significant advantages are realized which are not present in manual arrangements. The automatic selection is fast enough to be incorporated in an automatic radar tracking system which is not the case in manual operation which is too slow. Also manual video selection incorporates manually controlled switching arrangements which produce undesirable transients. Furthermore, due to the speed of the automatic arrangement, video signals are selected on a real time basis.

The operation of circuit 50 may further be explained and summarized in conjunction with FIG. 6 which is a multicolumn chart. In the left-hand column are listed various ECM environments and in the columns to the right are listed the various true signals expected under such environments and the functional performance of circuit 50 in producing a signal to select the video of the receiver assumed to be least affected.

It should be appreciated by those familiar with the art that presently known logic circuit and gating techniques may be employed to select the video of one of the receivers as a function of the performance-indicating signals supplied therefrom. The selection logic is provided so that only one receiver is selected at any one time. One example of logic circuitry to generate signals to select the video of one of the receivers in accordance with the relationships charted in FIG. 6 is shown in FIG. 7, to which reference is made herein. Therein, OR gate 61 is shown provided with inputs $K_1$ and $K_2$ and the output of an AND gate 62. Only when signals E, $\overline{H}$ and $\overline{I}$ are true does AND gate 62 provide a true output. On the other hand, when any of the inputs to gate 61 is true, its output is true and is used to enable video gating circuit 45 to select the video of the MTI receivers 33 (FIG. 3).

Similarly, signals G and F are supplied to an OR gate 63 while signals G and D are supplied to an AND gate 64 whose output is connected to gate 63 and to a radar display to supply a jam strobe signal when both inputs, i.e. D and G to gate 64 are true. When any of the inputs to gate 63 is true, the output and the gate is true and is used to enable the video gating circuit 45 to select the video of receiver 34.

To generate a signal to select the video of receiver 32 during pulse jamming, fast sweep jamming or transient interference, inverters 65, 66 and 67, AND gates 71 through 74, and OR gate 75 are used in logic circuit 50. They are interconnected to generate a true output of OR gate 75 when any one of the following four signal combinations is true: $\overline{E}\overline{H}\overline{I}$, $\overline{E}HI$, $EH\overline{I}$, and $EHI$. When the latter combination is true, the three inputs to gate 74 are true and thereof its output is true. In addition to activating gate 75, it also provides a jam strobe signal to a radar display. Similarly, the video gating circuit 45 may be constructed with known gating circuit techniques, one example of which is shown in FIG. 8, to which reference is made herein. For each bit of digitized video, circuit 45 may comprise three AND gates 45a, 45b and 45c, each having one input terminal connected to receive the video signal of another of the receivers. Each gate has another input terminal connected to the logic circuit 50 so that at any time, only one of the three gates is enabled depending on which receiver is selected. The outputs of the three gates are ORed through an OR gate 45d to develop an output signal that represents the selected bit of video and is applied to the video processor 55. Similar arrangements may be used to select analog video of one of the three receivers. In such cases, the signals from circuit 50 may be used to enable one of three analog channels.

There has accordingly been shown and described herein a novel arrangement for automatically selecting video signals from one of a plurality of receivers operating in an ECM environment. The selection is accomplished by monitoring or analyzing the video signals of at least some of the receivers to provide performance-indicating signals which, on the basis of the known performance characteristics of the receiver under different ECM environments, are used to automatically select the video signals of the receiver assumed to be least affected by the ECM environment at that particular time. It should be appreciated that in light of the foregoing disclosure of the teachings of the present invention, those familiar with the art may make modifications in the arrangements as shown or substitute equivalents thereof, without departing from the true spirit of the invention. Therefore, all such modifications and/or equivalents are deemed to fall within the scope of the invention as claimed in the appended claims.

What is claimed is:

1. A system comprising a plurality of radar receivers developing video signals, each receiver having predetermined performance characteristics in ECM environments;
   a processor responsive to the video signals provided by said plurality of radar receivers in ECM environments for monitoring ECM interference characteristics of the video signals of at least some of said receivers and for providing control signals in accordance therewith; and
   means included in said processor for automatically selecting the video signals of one of said receivers as a function of the control signals.

2. In a radar system wherein video signals are provided by a plurality of radar receivers in response to received radar echoes each receiver having predetermined performance characteristics in ECM environments, the improvement comprising:
   first means for automatically monitoring the video signals provided by at least some of said receivers to provide control signals indicative of the capture and/or saturation or performance of each of the receivers having the video signals thereof automatically monitored, said first means including clutter gating means for distinguishing clutter radar echoes received by the receivers being monitored from video saturation radar echoes received thereby; and
   second means responsive to said control signals for automatically selecting the video signals of one of said receivers as a function of the predetermined performance characteristics of said receivers in different ECM environments.

3. In a radar system wherein video signals are provided by a plurality of radar receivers in response to received radar echoes each receiver having predetermined performance characteristics in ECM environments, the improvement comprising:
   first means for automatically monitoring the video signals provided by at least some of said receivers to provide control signals indicative of the capture and/or saturation of performance or each of the receivers having the video signals thereof automatically monitored, said first means including first counting means for counting the video signals from each receiver being monitored which are below a first predetermined level, a predetermined count of said first counting means being indicative of the capture of said radar receiver, said first means further including second counting means for counting said video signals which are above a second predetermined level, a predetermined count of said second counting means being indicative of the saturation of the receiver being monitored; and
   second means responsive to said control signals for automatically selecting the video signals of one of said receivers as a function of the predetermined performance characteristics of said receivers in different ECM environments.

4. The arrangement defined in claim 3 wherein sid first means includes clutter sensing means for inhibiting said second counting means from counting video signals which are above said second predetermined level.

5. In a radar system operating in an ECM environment, the system including a plurality of radar receivers responsive to radar echoes from said environment for providing video signals, each receiver having known performance characteristics in different ECM environments, a processor for automatically selecting the video signals from a receiver least affected by said ECM environment, the processor comprising:
   input means for receiving the video signals provided by said plurality of receivers;
   means for quantizing the video signals from at least some of said receivers;
   first and second counting means associated with each receiver having quantized video signals, said first counting means counting the quantized video signals below a first quantized value and said second counting means counting the quantized video signals above a second quantized value, said first and second counting means respectively providing receiver capture and receiver saturation control signals when the counts therein reach preselected values; and
   video signal selection network including logic means responsive to said receiver capture and receiver saturation control signals from the counting means associated with receivers having quantized video signals for automatically selecting the video signals of the receiver least affected by ECM environment as a function of said control signals and the known performance characteristics of said receiver in different ECM environments.

6. The processor defined in claim 5 further including at least one clutter gating circuit for sensing clutter in the quantized video signals, said second gating means being responsive to said clutter gating circuit for inhibiting the counts therein in the presence of clutter.

7. The processor defined in claim 6 wherein said clutter gating means includes a multibit shift register and gating means for sensing the bits in said shift register and providing an inhibiting signal when the signal therein represents video exceeding a predetermined value.

8. The processor defined in claim 5 wherein at least one of said receivers in an MTI receiver.

* * * * *